UNITED STATES PATENT OFFICE.

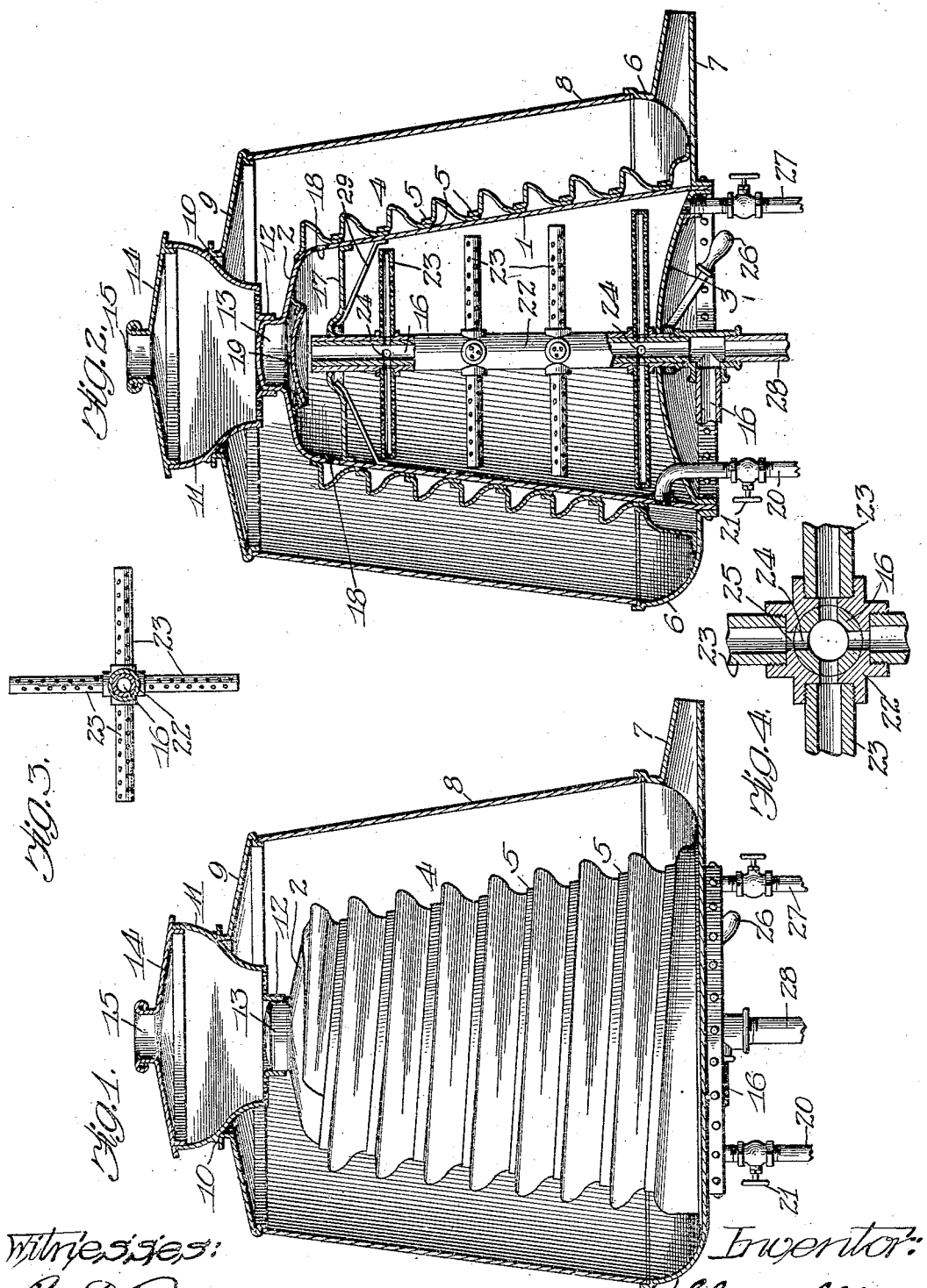

CHARLES SKIDD, OF KENOSHA, WISCONSIN.

PASTEURIZER.

955,481.  Specification of Letters Patent.  Patented Apr. 19, 1910.

Application filed October 31, 1908. Serial No. 460,510.

*To all whom it may concern:*

Be it known that I, CHARLES SKIDD, a citizen of the United States, residing at Kenosha, in the county of Kenosha and State of Wisconsin, have invented certain new and useful Improvements in Pasteurizers, of which the following is a specification.

One of the objects of this invention is to produce simple, conveniently operated and efficient means for pasteurizing or sterilizing milk, cream and other fluids.

Another object is to provide a pasteurizer which shall be of durable and inexpensive construction.

A further object is to obviate the necessity of using power to operate devices of this class, and in other ways to decrease the cost of operation.

A further object is to provide a pasteurizer or sterilizer that may be readily and thoroughly cleaned.

A further object is to produce a pasteurizer that may be operated with either hot water or steam.

In the accompanying drawings, Figure 1 is an elevation, with parts in section, of a pasteurizer or sterilizer embodying my invention. Fig. 2 is a vertical central section through the pasteurizer. Fig. 3 is a sectional view illustrating the steam distributing pipes. Fig. 4 is a sectional view of the connection between said pipes and the supply pipe.

The embodiment herein shown of my invention comprises a pasteurizing structure arranged to be heated by steam or hot water supplied to the interior thereof, over the exterior of which structure the milk or cream is arranged to flow by gravity.

In the present instance, the pasteurizing structure referred to comprises a frusto-conical shell 1, of any suitable construction, the upper and smaller end of said shell being closed by the top wall 2 and the lower end by a head 3. Upon the outer side of the tapering walls of said shell is mounted a means for causing the milk to flow slowly from the top to the bottom of the structure, which means, as herein shown, consists of a shelf-like structure 4 helically wound upon and secured to the shell 1. The upper side of said helical structure, when viewed in cross section, is more or less nearly horizontal, and thus constitutes a shelf upon which the milk may flow helically downward around the pasteurizing structure. The shelf-like structure 4 is preferably formed of sheet metal and may be constructed in any desired way. As herein illustrated, the coils of said structure are secured together and to the shell 1 by means of the overlapping flanges 5. It will be understood that the thickness of the walls of the shelf-like structure, as represented in Fig. 2, is much exaggerated. The lower end of the pasteurizing structure is surrounded by an annular trough 6 which receives the milk flowing down the sides of said pasteurizing structure, the milk being discharged through a spout 7.

If desired, the pasteurizing structure may be inclosed by a protective mantle 8 adapted to rest upon the trough 6. The mantle 8 is provided with a removable cover 9 having a central opening 10 in which is removably supported a bowl 11. The bottom of the bowl 11 is perforated so as to discharge the milk or cream onto the top wall 2 of the pasteurizing structure. If desired, the lower end of the bowl 11 may be provided with an annular flange 12 to fit upon a central cylindrical projection 13 upon the top wall 2. The bowl 11 may have a cover 14 provided with an inlet opening 15.

Preferably the shelf-like structure 4 is hollow to form a conductor for a heating medium. A heating fluid, such as steam, may be admitted to the interior of the pasteurizing structure by means of a pipe 16 supported in a vertical position and axially of the pasteurizing structure by any suitable means. The upper open end of said pipe projects through a central opening in a partition 17 extending transversely across the shell 1 near the upper end thereof. The space above the partition 17 communicates with the interior of the helical conductor 4 through one or more openings 18. In order to prevent the steam discharged from the pipe 16 from impinging directly upon the top wall 2 and overheating the milk, a deflector 19 may be provided above the outlet end of said pipe. The water of condensation may be drained from the helical conductor 4 by means of a pipe 20 having a valve 21. If, in addition to internally heating the helix 4, it be desired to heat the interior of the shell 1, suitable means may be provided, as, for example, a tube or sleeve 22 rotatably mounted upon the pipe 16 and having any desired number of perforated distributing arms 23 thereon, said arms connecting with the interior of the pipe 16 through ports 24 and 25 in said pipe and the tube 22, respectively. When it is desired to shut off the supply of steam to the interior of the shell 1, the tube 22 is rotated to carry the ports 25 out of register with the ports 24. Any preferred means may be used for thus rotating the tube 22, such as a hand lever 26 fixed to said tube. The water of condensation may be drained from the shell 1 through a valved pipe 27. A pipe 28 connecting with the lower end of the steam supply pipe 16 leads to a trap (not shown). If desired, the shell 1 may be braced in any suitable way against bursting pressures, as, for example, by means of stays 29 extending between said shell and the partition 17.

When it is desired to use hot water instead of steam, the tube 22 is rotated to close communication between the interior of the shell 1 below the partition 17 and the interior of the helix 4. Hot water under pressure may then be admitted to the pipe 20, the water flowing helically around the shell 1 to the upper end thereof and being discharged through the pipe 16. When steam is used for heating the milk, steam of proper temperature and pressure is admitted to the pasteurizing structure in suitable quantity to heat the milk or cream to the desired temperature.

In practice, the helix 4 and the space above the partition 17 is permitted to become filled to a greater or less extent with water of condensation. At the end of a run this water may be drained from the helix by means of the pipe 20. The water in said helix is maintained at the desired pasteurizing temperature by the steam within the shell 1. The milk flowing from the bowl 11 through the perforated bottom of the latter, spreads out into a thin sheet upon the upper wall 2 of the shell 1 and flows helically downward around said shell. The milk being thus distributed in a thin film over a considerable area of heating surface, it is thoroughly heated to practically the same temperature as the hot water in the helix 4. As substantially all of the milk flows by gravity in a helical path around the pasteurizing structure, it is exposed to the heating medium for a considerable length of time.

It will be noted that all the surfaces with which the milk comes into contact are upon the outside of the heating device and readily accessible for thorough cleaning. When the helical shelf 4, the top wall 2, and the inside of the trough 6 are to be cleaned, the mantle 8 is lifted off said trough.

I desire to have it understood that I wish not to be limited to the details of construction herein illustrated and described, for various modifications will occur to persons skilled in the art.

I claim as my invention:

1. A pasteurizer comprising a hollow structure having means upon its exterior for receiving a heating medium, and a conductor with said structure and in communication with said receiving means, said conductor being arranged to communicate with the interior of said structure.

2. A pasteurizer comprising a hollow structure having means upon its exterior for receiving a heating medium, a conductor within said structure and in communication with said receiving means, said conductor being arranged to communicate with the interior of said structure, and means for placing said conductor in and out of communication with the interior of said structure.

3. A pasteurizer comprising a structure having upon its exterior a conductor for a heating medium, a pipe extending through said structure and communicating with said conductor, and means for placing said pipe in and out of communication with the interior of said structure.

4. A pasteurizer comprising a structure having upon its exterior a conductor for a heating medium, a pipe extending through said structure and communicating with said conductor, and perforated arms on said pipe within said structure.

5. A pasteurizer comprising a structure having upon its exterior a conductor for a heating medium, a pipe extending through said structure and communicating with said conductor, a tube rotatably mounted on said pipe and carrying a plurality of distributing pipes, said tube and said first mentioned pipe having ports therein arranged to register, and means for rotating said tube.

6. A pasteurizer comprising a frusto-conical shell, a helical conductor upon the exterior of said shell for a heating medium, an outlet at the lower end of said conductor, a partition forming a chamber in the upper end of said shell, said chamber communicating with said conductor, and a pipe communicating with said chamber.

7. A pasteurizer comprising a frusto-conical shell, a helical conductor upon the exterior of said shell for a heating medium, an outlet at the lower end of said conductor, a partition forming a chamber in the upper end of said shell, said chamber communicating with said conductor, and a vertical pipe extending centrally of said shell and communicating with said chamber.

8. A pasteurizer comprising a frusto-conical shell, a helical conductor upon the exterior of said shell for a heating medium, an outlet at the lower end of said conductor, a partition forming a chamber in the upper end of said shell, said chamber communicating with said conductor, a vertical pipe extending centrally of said shell and communicating with said chamber, and means for placing said pipe in communication with the space in said shell below said partition.

9. A pasteurizer comprising a frusto-conical shell having top and bottom walls, a helical conductor upon the exterior of said shell for a heating medium, a pipe communicating with the lower end of said helix, a partition forming a chamber in the upper end of said shell, said chamber communicating with the upper end of said helix, a vertical pipe extending axially of said shell and communicating with said chamber, a tube rotatably mounted on said pipe, perforated distributing arms carried by said tube, said tube and said pipe having ports therein arranged to register, means for rotating said tube, and means for draining the interior of said shell below said partition.

CHARLES SKIDD.

Witnesses:
NELLIE E. LIPPERT,
C. OZANNE.